Figure 4:
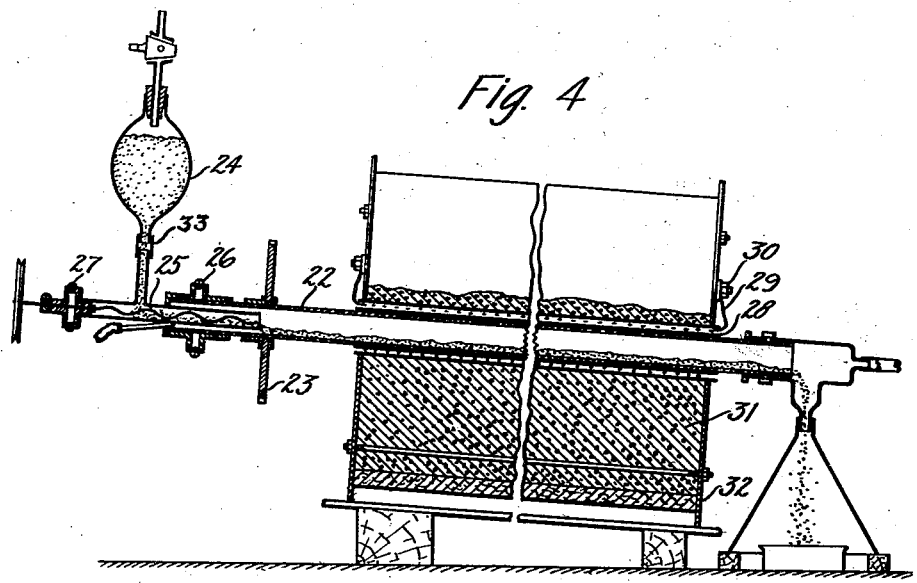

July 23, 1929.  H. H. LOWRY  1,722,055
PREPARATION OF GRANULAR CARBON
Filed June 1, 1925    2 Sheets-Sheet 1
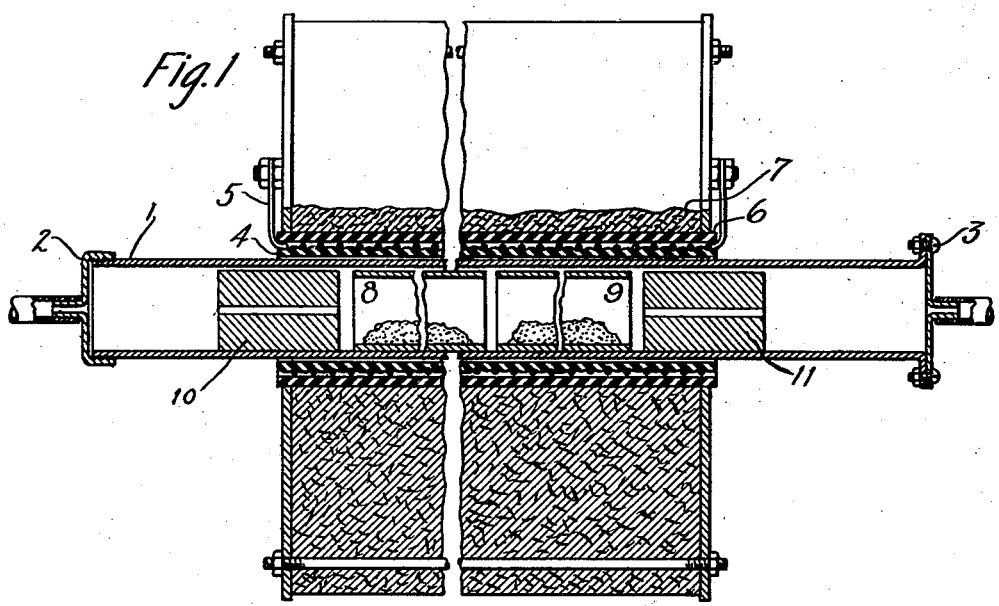
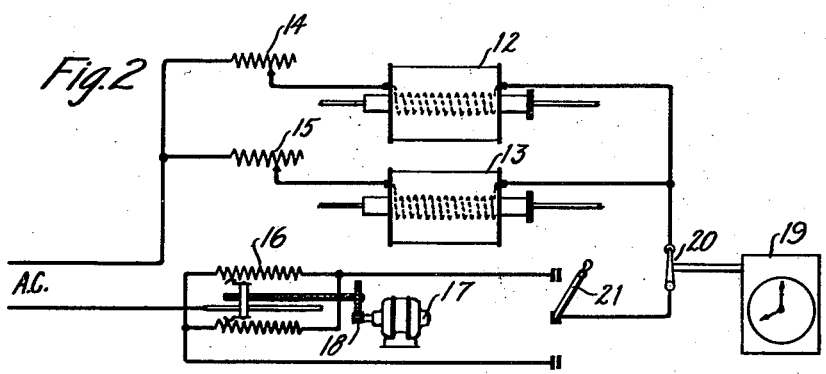
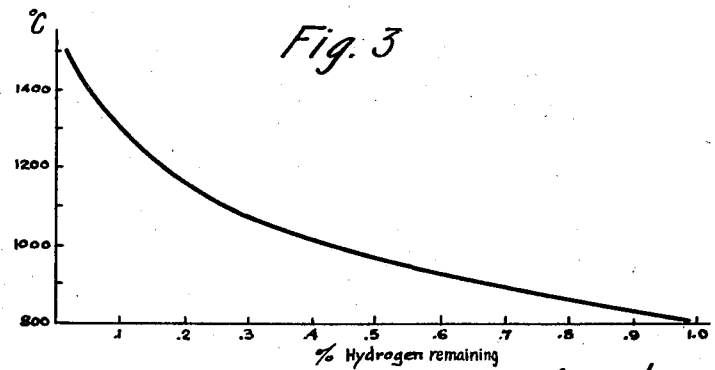
Inventor:
Homer H. Lowry,
by E. W. Adams, Atty Inventor:
Homer H. Lowry,
by _____ Atty Patented July 23, 1929.

1,722,055

UNITED STATES PATENT OFFICE.

HOMER H. LOWRY, OF MOUNTAIN LAKES, NEW JERSEY, ASSIGNOR TO WESTERN ELECTRIC COMPANY, INCORPORATED, OF NEW YORK, N. Y., A CORPORATION OF NEW YORK.

PREPARATION OF GRANULAR CARBON.

Application filed June 1, 1925. Serial No. 34,084.

This invention relates to the manufacture of carbon and more particularly it has to do with the production of a granular carbon suitable for use in telephone transmitters.

Such carbon must not only have the required volume efficiency when assembled in a transmitter but it must also be free from certain objectionable characteristics which carbons improperly prepared are liable to exhibit or develop in service. These are "burning" or a disagreeable sputtering noise which sometimes becomes sufficiently troublesome as to interfere with transmission, and "aging" or a tendency for the carbon to change in resistance with use and to change in sensitivity or volume efficiency. The latter is usually evidenced by an increase in resistance although it is possible to have a decrease in resistance.

Entering into the question of microphonic behavior are a number of factors which must be taken into consideration. One of these, the resistance of the carbon button is dictated by the requirements of the type of telephone circuit in which the transmitter is destined to be used and is controllable to some extent by the design of the electrode chamber. The contact resistance of the carbon granules and the variation thereof under agitation while differing in different parts of a granular mass depending upon the design of the electrode chamber and the amount of granular carbon which it contains are nevertheless determined by the physical and chemical characteristics of the carbon itself and, therefore, by the method of preparation. Both the surface roughness of the granule and the thickness and character of the adsorbed or surface gas play a part in determining the contact resistance though it is probable that the amount of the adsorbed or surface gas is appreciably influenced by, or is a function of, the surface roughness.

The resistance of transmitter carbon is made up of the actual resistance of the carbon based upon its specific resistance and the contact resistance between the individual carbon granules. The specific resistance of the carbon may be partially controlled by the hydrogen content of the carbon resulting from the content of undecomposed raw material, since the product approaches pure graphite as the hydrogen content is decreased. That type of aging which is evidenced by a decrease in resistance is due in part to a change in the specific resistance of the carbon as influenced by the hydrogen content of the carbon which has been found to decrease as the carbon is heated to high temperatures resulting from the application of high voltages.

I have found that the contact resistance is influenced principally by the contact area and the adsorbed or surface gas at the surface of contact, being increased with decreasing contact area and with increasing amounts of adsorbed gas. Carbon not initially roughened becomes roughened in service and consequently in time increases its ability to adsorb gas and thus develops a higher contact resistance. The production of an initial surface roughness has therefore a stabilizing effect in that it reduces aging of the carbon in service.

The porosity of the individual carbon granules will appreciably influence the contact area since it is evident that a porous carbon will have less surface area at any given point than a non-porous carbon. It is desirable, therefore, to control the porosity and thereby control the contact area, in order to regulate the actual increase in contact resistance which is caused by producing an initial surface roughness to decrease aging.

It has been noticed that the "burning" which occurs in a telephone transmitter may be divided into two types, that which occurs at low voltages, and that which occurs at high voltages.

I have found that low voltage burning is directly related to the gas content of the granules; that when the intergranule contacts become heated by the passing of current therethrough the adsorbed or surface gas in the pores expands and in a series of explosive eruptions cause disruptions of the granular contacts thus causing a sputtering noise in the telephone receiver. By controlling the porosity of the granular carbon therefore the amount of adsorbed gas and consequently the burning can be controlled.

The high voltage burning has similarly been found to be caused by disruptions in the carbon granules resulting from explosive eruptions of expanding gas. The gas in this type of burning however, results from further decomposition of the raw material due to the high temperature resulting from the passage of current through the carbon at higher voltages. This burning may be controlled therefore by regulating the hydrogen content of the granules as determined by the temperatures reached in the roasting process.

This invention provides a double roasting process under conditions controlled as regards time, temperature and atmosphere surrounding the material in the furnace, comprising a pre-roast and a final or surfacing operation whereby the porosity of the granules, their surface roughness, the amount of adsorbed or surface gas and specific resistance are controllable so that a granular carbon can be made according to specification and can be reproduced with a degree of certainty not heretofore obtainable.

Granular carbon for telephone transmitters is customarily made from high grade anthracite coal having a small percentage of ash, (less than 5%) and having a percentage of volatile matter preferably less than 10%. The coal is crushed, sieved to the desired size, and then washed free from dust.

The volatile matter contained in the raw coal is driven off upon heating, leaving the carbon more or less porous. According to the invention the granular raw material, preferably anthracite coal, is first given a pre-roast which is so controlled that the porosity is kept at a satisfactorily low figure. It has been found that rapid heating yields a more porous product than slow heating. Consequently, the pre-roast is preferably carried out slowly, the temperature being gradually raised over a period of several hours to a maximum temperature which is somewhat lower than the temperature which is to be used in the final or surfacing operation. The mass is maintained at this maximum temperature for a suitable period of time preferably shorter than the period of gradually increasing temperature, and then allowed to cool.

The final product obtained by a given surfacing operation is definitely conditioned particularly as regards porosity and surface roughness by the choice of the pre-roast maximum temperature. During the pre-roast the atmosphere in the furnace is replaced by a non-carbon reactive atmosphere, such as hydrogen for instance, a stream of which is kept flowing through the furnace to carry off the gases of decomposition.

The porosity of the carbon having been controlled by the pre-roast, there remains to be controlled by the final or surfacing operation, first, the content of undecomposed hydro-carbon material and therefore the hydrogen content and specific resistance, and second, the surface roughness and the amount of adsorbed or surface gas. The hydrogen content is controlled by the maximum temperature reached in the operation while the surface roughness and the amount of adsorbed or surface gas are regulated by the composition or nature of the atmosphere in which the carbon is heated during this process and by the rate at which the gas is allowed to pass through the furnace during the operation. In order to roughen the surface it is evident that an oxidizing atmosphere should be employed in this operation, the content of oxidizing material being dictated by the degree of roughness desired for the particular carbon being produced.

The invention can be best understood by the following detailed description of a particular apparatus and process which has been employed for producing carbon suitable for a standard type of telephone transmitter.

Figure 5:
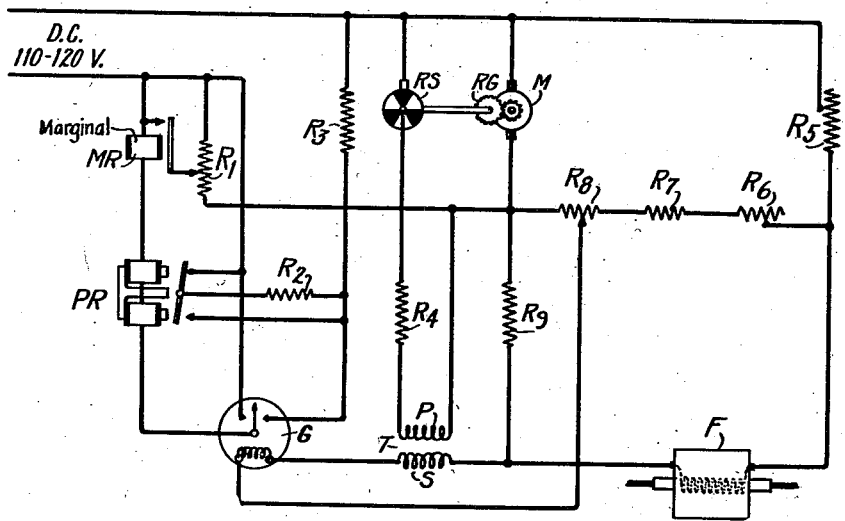

In the drawings in which the same reference characters represent similar parts, Fig. 1 is a longitudinal cross-sectional view of a pre-roast furnace; Fig. 2 is a wiring diagram showing the electrical connections for regulating and heating the pre-roast furnace; Fig. 3 is a graphical representation showing the relation between the amount of hydrogen remaining in the hydro-carbons undecomposed during the heating operations and the temperatures employed therein; Fig. 4 is a longitudinal vertical cross-sectional view of the final or surfacing furnace and the adjoining set-up; Fig. 5 shows the electrical connections for heating the surfacing furnace together with the temperature regulator employed therewith.

The pre-roast furnace is illustrated herein as a periodic furnace, that is, one in which the raw material is heated in batches, on account of the long period of time over which the pre-roast operation is continued, although a continuously operating furnace may be employed.

Referring to Fig. 1 of the drawings, a suitable pre-roast furnace comprises a central tube 1, of suitable inert material such as hard procelain or nickel, fitted with gas inlet and outlet caps 2 and 3. As a heating unit there is provided a grooved tube 4, of alundum or other refractory insulating material, wound with nichrome or other high resistance wire 5, the number of turns of wire per inch being determined by the individual characteristics of the particular furnace such as size of core, amount of insulation and temperature desired. The heating unit fits into a tube 6 of refractory material over which is applied a coating 7 of insulating material such as magnesia, asbestos or magnesia-asbestos. The heating unit is preferably removably fitted into tube 6 so that it may be removed for repairs or replacement without dismantling the furnace.

The carbonaceous raw material is placed in suitable crucibles such as 8 and 9 which are placed within tube 1. These crucibles are preferably of graphite to insure the absence of reaction between the material of the crucible and the carbon being prepared.

In order to minimize heat losses through the ends of the tube 1 and thereby maintain a more nearly uniform temperature within the insulated or heated portion of the said tube, cylinders 10 and 11 of refractory material such as fire clay are inserted at the ends of the said tube.

As stated above, the rate of driving off the volatile matter and therefore the rate of heat, substantially influences the porosity of the final product. This result will be more evident when studied in connection with Fig. 3 of the drawings, which is a graphical representation of the relation between the amount of hydrogen remaining in undecomposed hydrocarbons and the temperature at which the decomposition is effected. Since the curve rises more rapidly with increasing temperatures, becoming more nearly asymptotic to the temperature axis, the amount of hydrogen driven off for a given increase in temperature is larger at the lower temperatures and becomes smaller at the higher temperatures. To insure the production of a carbon of low porosity, therefore, the temperature should be increased slowly with time at the lower temperatures, the ratio of increasing temperature to increasing time being made larger as the temperature increases, since such an increase in said ratio does not appreciably increase the porosity of the final product.

The lower limit of the range of suitable pre-roast maximum temperatures will be determined in any given case by the degree of porosity desired in that case. It has been found that low pre-roast temperatures result in the production of a more porous carbon product after the surfacing operation.

The rate of heating or the duration of heat, since the miximum temperature is set by the surfacing operation, will be determined by the particular conditions present in each case, such as the hydrogen content of the raw material. For anthracite coal of the characteristics defined above, a gradual rise of temperature over a period of 14 hours to a maximum of in the neighborhood of 800° to 1100° C. has been found satisfactory.

The final maximum temperature reached in the pre-roast operation should be lower than the final maximum temperature employed in the surfacing operation. The pre-roast maximum temperature should always be kept below the surfacing maximum temperature.

It has been found that this difference in temperature should preferably be maintained at from 50° to 350° C. in order to produce the results outlined above. Under such conditions of heating temperature differences of ±20° to 30° due to such causes as non-uniform temperature distribution in the pre-roast furnace are of relatively little importance since in the final heating operation all material is heated to a higher temperature which is controlled within narrow limits.

During the pre-roast operation the atmosphere in the furnace is replaced by an atmosphere of gas which is non-reactive with carbon so that the surface roughness of the granules is substantially controlled by the surfacing operation. Hydrogen has, for example, been found to be satisfactory, a slow stream being kept flowing through the furnace to carry off gases of decomposition. A satisfactory rate of flow of hydrogen during the complete cycle of roasting and cooling has been found to be 0.5 cubic foot per hour for a furnace having an internal cross-sectional area of approximately 3 square inches.

One method of controlling the rate of increase in temperature for the pre-roast furnace is as shown in Fig. 2 of the drawings, this diagram showing the connections when two furnaces are employed. The furnaces 12 and 13, are placed in parallel across an incoming source of power. Rheostats 14 to 15, are placed in series respectively with the furnaces 12 and 13, the settings on these rheostats determining the maximum temperature to which the furnaces 12 and 13 will be heated. A varying rheostat 16, driven by motor 17 through reducing gears 18, regulates the rate at which the temperature is increased. After the furnaces have reached the maximum temperature as determined above, a time switch 19, opens the circuit through switch 20. Switch 21 is employed for reversing the current in the temperature regulation set-up after each heating period.

Since the temperatures near the ends of the furnace are lower than that at the middle, the pre-roast raw material is preferably well mixed before being given a final or surfacing treatment.

As outlined above, the variable factors incidental to the final or surfacing operation must be controlled within narrow limits since the hydrogen content and the surface roughness and therefore the contact resistance and aging tendency of the final product are determined by the treatment received in this operation. A continuous process employing a rotating inclined tube furnace and including an accurate temperature control device and means for controlling movement of the carbon through the furnace and means for controlling the atmosphere in the furnace has therefore been employed.

A suitable furnace comprises a central tube 22 of alundum or other refractory material which is gas tight and through which the carbon is "tumbled" or passed. This tube is rotated at a suitable rate by means of a gear 23, by reducing gears and motor. The carbon is fed into the furnace, from a hopper 24, which is provided with a valve 33, by a spiral conveyor or feeder 25, which is driven by the same reducing gear employed to rotate tube 22. In order to make possible the close regulation of the atmosphere entering the furnace the joints and connections at the intake end of the set-up are preferably made substantially gas-tight. For this purpose, mercury seals 26 and 27 have been found satisfactory.

The heating unit comprises a grooved refractory tube 28, as alundum, wound with wire 29 having preferably not too small a temperature coefficient of resistance and which does not oxidize or corrode readily at the temperature employed. Platinum 90%, rhodium 10%, alloy wire, has for example, been found satisfactory for this purpose. As in the pre-roast furnace, the heating unit is preferably made removable by enclosing it in a refractory tube 30, over which the insulation is placed. Insulation might comprise for example, a powdered sil-o-cel (refractory powder made from diatomaceous earth) 31, held in place with magnesia-asbestos pipe-covering 32.

It has been found desirable to maintain the carbon at the maximum controlled temperature for a period of approximately one hour. The rate of rotation of the furnace and its angle of inclination will therefore be determined by the length of the furnace which is maintained at the control temperature. For a tube whose controlled temperature length is 2 feet for example, a rate of rotation of the tube of one revolution per minute when inclined at an angle of $4\frac{1}{3}°$ to the horizontal has been found satisfactory, since these conditions produce a rate of movement of the granular carbon of 2 feet per hour.

The method of temperature control employed in connection with the surfacing furnace may be any method by which a temperature control of in the neighborhood of $\pm 5°$ C. may be effected. The Wheatstone bridge regulator shown in Fig. 5 of the drawings and described in the Journal of the American Ceramic Society, volume 6, pages 1209 to 1213, 1923, by E. N. Bunting, has been found satisfactory for this purpose.

The maximum temperature employed in the final operation will depend, as outlined above, upon the hydrogen content desired, as determined by the specific resistance value desired, it having been found in accordance with the invention that higher temperatures produce lower specific resistance carbon granules. The relation between the maximum temperature and the specific conductance has been found accordingly to be a straight line function, whose rate of slope is approximately $2 \times 10^4$ (20,000).

The nature of the gas used in the surfacing furnace and the rate at which said gas passes through the furnace with a given rate of movement of the carbon through the furnace have been found to be determined by the degree of surface roughness and amount of adsorbed or surface gas desired in the final product. Since these operating factors are independent of each other, the control of the characteristics of the carbon may be effected by maintaining either factor constant and varying the other. As a general rule, I have found that an increase in either the rate of gas motion or the oxidizing power of the gas will produce more highly roughened carbon granules.

I have found that a choice of values for the factors outlined above is dependent upon the temperature reached in the pre-roast operation, it having been found that better oxidizing conditions are required with higher pre-roasting maximum temperatures.

A satisfactory set of conditions has been found to be the use of an atmosphere of carbon dioxide, air, mixtures of carbon-dioxide, air, or hydrogen with water vapor, or mixtures of carbon-dioxide and air, at a rate of 0.1 to 1.0 cubic feet per hour for a furnace having an internal cross-sectional area approximately 0.8 square inches when the pre-roast maximum temperature has been from 800° to 1100° C.

The final or surfacing operation is preferably a continuous process, as illustrated, in order to insure the reproduction of conditions, as regards time, temperature, and atmosphere, for each granule of carbon. A periodic process which insured the production of such a result would, however, be satisfactory, though it is probable that a continuous process is better adapted for commercial application. It will, of course, be understood the carbon granules for use in a particular type of transmitter must be very carefully made in order that the assembled transmitter have the desired transmission characteristics. For a different type of transmitter quite a different combination of the properties of the carbon is necessary for the satisfactory operation of the transmitter. Thus it will be necessary to standardize a number of different kinds of carbon for different types of use.

In speaking of the "oxidizing power" of a given atmosphere it is intended herein to mean the ability of said atmosphere to oxidize a given standard material, and by a "controlled oxidizing atmosphere" is meant one that may be between the limits of no oxidizing atmosphere and an oxidizing atmosphere as high as may be desired for the purpose of this invention.

"Non-carbon reactive atmosphere" has been employed herein to define an atmosphere whose constituents will not react with carbon at the temperature employed.

The invention has been illustrated in connection with the particular apparatus and a particular process and it will be understood that it is not intended to limit the method of preparation to a particular apparatus or the product to a particular method of preparation but that the invention is susceptible of various modifications and adaptations within the scope of the appended claims.

What is claimed is:

1. The method of producing granular carbon which comprises heating comminuted carbonaceous raw material, increasing the temperature at such a rate that a low homogeneous product of low porosity is produced, and subsequently subjecting the product to a heating at a higher temperature.

2. The method of producing granular carbon which comprises heating carbonaceous raw material, increasing the temperature at such a rate that a low porosity product is produced, and subsequently subjecting the product to a heating at a higher temperature in an atmosphere whose oxidizing power is controlled so as to control the surface roughness of the final product.

3. The method of producing granular carbon which comprises heating carbonaceous raw material in a non-carbon reactive atmosphere, increasing the temperature at such a rate that a low porosity product is produced, and subsequently subjecting the product to a heating at a higher temperature in an atmosphere whose oxidizing power is controlled so as to control the surface roughness of the final product.

4. The method of producing a homogeneous granular carbon product which comprises heating comminuted carbonaceous raw material, controlling the temperature during said heating so that it is raised gradually to a maximum, and subsequently subjecting the product to a temperature from 50 to 350° C. higher than said initial maximum temperature.

5. The method of producing granular carbon which comprises heating carbonaceous raw material in a non-carbon reactive atmosphere, increasing the temperature gradually to a maximum, and subsequently subjecting the product to a temperature of from 50 to 350° C. higher than said initial maximum temperature in an atmosphere of controlled oxidizing power to produce a roughened surface.

6. The method of producing granular carbon which comprises heating carbonaceous raw material in a non-carbon reactive atmosphere, increasing the temperature gradually to a maximum, and subsequently subjecting the product to a temperature of from 50 to 350° C. higher than said initial maximum temperature in an atmosphere of controlled oxidizing power to produce a roughened surface, and controlling said second maximum temperature within narrow limits.

7. The method of producing granular carbon which comprises heating carbonaceous raw material in a non-carbon reactive atmosphere, increasing the temperature gradually to a maximum, subsequently subjecting the product to a higher temperature in an atmosphere of controlled oxidizing power to produce a roughened surface and controlling said higher temperature within narrow limits.

8. The method of producing granular carbon which comprises heating carbonaceous raw material in an atmosphere of hydrogen, increasing the temperature gradually to a maximum to produce a substantially low porosity, subsequently subjecting the product to a higher temperature in an atmosphere of controlled oxidizing power to produce a roughened surface, said higher temperature being from 50 to 350° C. above said initial maximum temperature to produce a low hydrogen content, and controlling said higher temperature within narrow limits.

9. The method of producing granular carbon which comprises heating carbonaceous raw material in an atmosphere of hydrogen, increasing the temperature gradually to from 800 to 1100° C., subsequently subjecting the product to a higher temperature in an atmosphere of controlled oxidizing power to produce a roughened surface, said higher temperature being from 50 to 350° C. above said initial maximum temperature to produce a low hydrogen content, and controlling said higher temperature within narrow limits.

10. The process of making granular carbon for microphonic purposes which comprises heating comminuted carbonaceous material to a temperature not lower than 800 degrees centigrade nor higher than 1100 degrees centigrade in a non-oxidizing atmosphere.

In witness whereof, I hereunto subscribe my name this 29 day of May A. D., 1925.

HOMER H. LOWRY.